(12) United States Patent
Feller

(10) Patent No.: US 9,470,566 B1
(45) Date of Patent: Oct. 18, 2016

(54) TRANSDUCER MOUNTED BETWEEN TWO SPACED-APART INTERIOR SURFACES OF A CAVITY IN THE WALL OF A FLOW TUBE

(71) Applicant: Onicon, Inc., Clearwater, FL (US)

(72) Inventor: Murray F Feller, Micanopy, FL (US)

(73) Assignee: Onicon, Inc., Largo, FL (US)

( * ) Notice: Subject to any disclaimer, the term of this patent is extended or adjusted under 35 U.S.C. 154(b) by 0 days.

(21) Appl. No.: 14/686,129

(22) Filed: Apr. 14, 2015

(51) Int. Cl.
*G01F 1/66* (2006.01)

(52) U.S. Cl.
CPC ..................... *G01F 1/667* (2013.01)

(58) Field of Classification Search
None
See application file for complete search history.

(56) References Cited

U.S. PATENT DOCUMENTS

| | | | | |
|---|---|---|---|---|
| 8,997,584 B1* | 4/2015 | Feller | ..................... | G01F 1/662 73/861.26 |
| 2009/0100940 A1* | 4/2009 | Strunz | ..................... | G01F 1/662 73/861.28 |

* cited by examiner

*Primary Examiner* — Harshad R Patel
(74) *Attorney, Agent, or Firm* — David Kiewit

(57) ABSTRACT

An ultrasonic flow meter comprises a cavity disposed in the wall of a flow tube. This cavity is preferably elongated along a direction perpendicular to a flow axis and has a flat interior surface portion proximal an interior surface of a wall of the flow tube. A piezoelectric transducer has a surface bonded to the flat interior surface portion of the cavity so as to transmit and receive acoustic signals through a thin window in the wall of the flow tube. An encapsulant, which may be combined with other elements, such as a mechanical strengthening piece, bonds the second side of the piezoelectric wafer to a second surface of the cavity. In a particular preferred embodiment, the cavity may be a dovetailed groove cut into a wall of the flow tube.

13 Claims, 3 Drawing Sheets

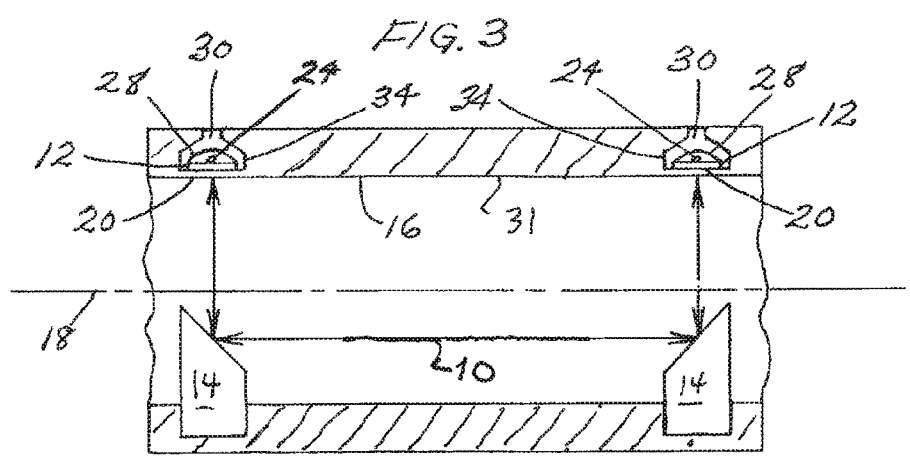
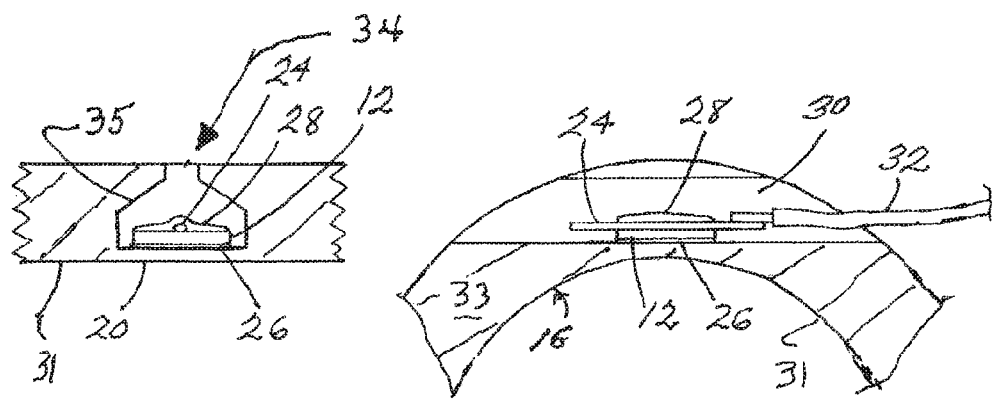

US 9,470,566 B1

TRANSDUCER MOUNTED BETWEEN TWO SPACED-APART INTERIOR SURFACES OF A CAVITY IN THE WALL OF A FLOW TUBE

BACKGROUND INFORMATION

This invention pertains to acoustic transducers, and particularly to mounting configurations for ceramic piezoelectric elements of the flat wafer type that are used in many industrial, commercial and medical applications such as flow meters.

Prior art acoustic flow meters typically position transducer elements behind protective windows. Although transducers may be mounted on the outside of a flow tube containing the flowing fluid, the best measurement performance is obtained using wetted transducers because of their intimate acoustic coupling to the fluid and lack of acoustic beam corruption when the beam propagates through the flow tube wall. However, the wetted transducer cost is relatively high because it is configured as a separate part that fits into a dedicated mounting assembly on the flow tube.

The inventor teaches a transducer bonded to a thin wetted window and encapsulated with rigid material to provide adequate strength for high pressure operation in U.S. Pat. No. 8,256,076.

BRIEF SUMMARY OF THE INVENTION

One aspect of the invention is that it provides an ultrasonic flow meter having a cavity disposed in the wall of a flow tube. This cavity is preferably elongated along a line perpendicular to a flow axis and spaced apart therefrom by a distance selected so that the cavity does not penetrate an interior surface of a wall of the flow tube. The preferred cavity has a flat interior surface portion proximal the interior surface of the wall of the flow tube. A piezoelectric transducer wafer preferably has a first of its two flat surfaces bonded rigidly to the flat interior surface portion of the cavity so as to be able to transmit and/or receive acoustic signals through the wall of the flow tube and into the fluid when the instrument is operating. An encapsulant, which may be combined with other elements, such as a mechanical strengthening piece, is preferably used to bond the second side of the piezoelectric wafer to a second surface of the cavity that is spaced apart from the flat interior surface portion. In a particular preferred embodiment, the cavity may be a dovetailed dovetail groove cut into a wall of a flow tube and providing, as the second surface, a slanted interior surface 35 that narrows with distance from the flow tube axis.

An object of the invention is to provide a transducer arrangement which uses the flow tube material for mounting the element in a way that provides the performance of a wetted transducer.

One aspect of the invention is that a non-penetrating slot, orthogonal to the flow passage, may be made into the flow tube to provide a mounting surface and an acoustic window for a piezoelectric element. The element is bonded to the slot surface adjacent to the flow passage after which the remainder of the slot is encapsulated. The shape of the slot enables the flow tube to continue to maintain fluid pressure even though the window between the element and fluid can be thin. Thus, wetted transducer performance is preserved while costs are reduced.

Another aspect of the invention is that it provides broad-area continuous electrical connection across the contact surfaces of the elements. This enables elements to continue to perform even though they may be mechanically fractured.

Another aspect of the invention is that a piezoelectric element may be bonded to a metallic flow tube with solder to provide both electrical connectivity and mechanical attachment.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 3 is a schematic cross-sectional view of an ultrasonic flow meter using transducers configured according to the present invention.

FIG. 4A is a schematic cross-sectional view of a transducer configured according to the present invention, the view taken perpendicular to both the cavity axis and the flow tube axis, wherein the flow tube has a rectangular configuration.

FIG. 4B is a schematic cross-sectional view of a transducer configured according to the present invention, the view taken perpendicular to both the cavity axis and the flow tube axis, wherein the flow tube has a circular cross-section.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
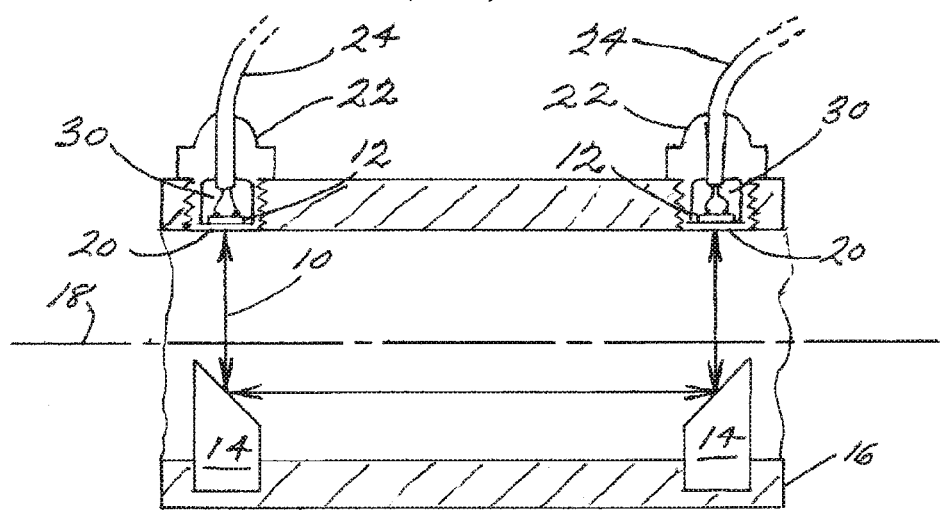
FIG. 1 is a schematic cross-sectional view of a prior art flow meter using wetted transducers.

A prior art transit-time flow meter, depicted in FIG. 1, employs post reflectors 14 to define an acoustic path 10, indicated by arrowheaded lines extending between two transducers 12 that transmit and receive ultrasonic signals. These signals are electronically processed to yield a measurement of flow rate. The transducer elements 12 are mounted in a housing 22 with acoustic windows 20, that thread into openings on the flow tube 16 so that the windows are in direct contact with fluid flowing along the axis 18 of the flow tube 16. The elements are electrically isolated whereby both wires lead out, and their wiring chambers are usually filled with an encapsulating resin 30.

Figure 2:
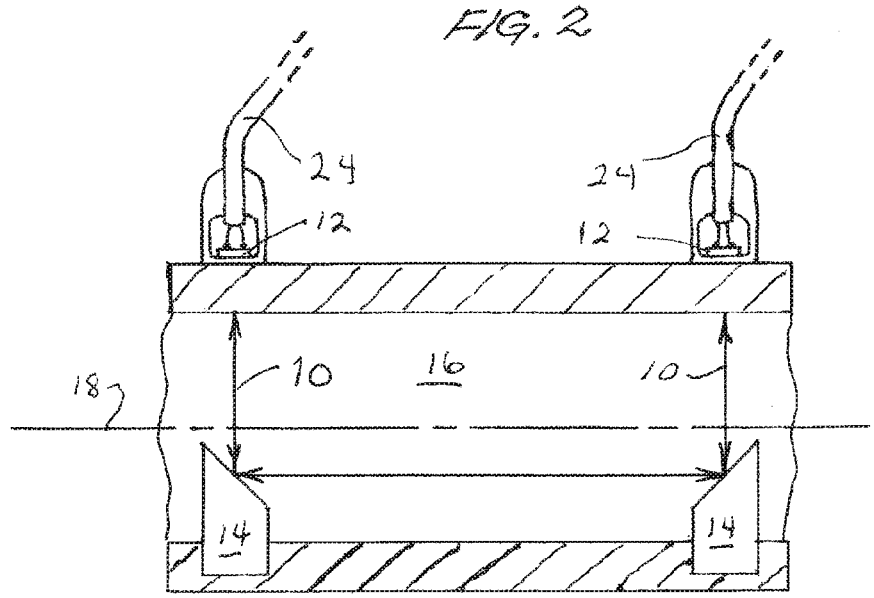
FIG. 2 is a schematic cross-sectional view of a prior art flow meter using externally mounted transducers.

Another prior art flow meter is depicted in FIG. 2 where the transducers are mounted on the outside of the flow tube. The external transducer configuration provides lower accuracy than the meter of FIG. 1 because of attenuation, beam spreading and internal reflections caused by the flow tube wall.

Turning now to FIGS. 3, 4A, 4B, and 5, one finds depictions of ultrasonic transit-time flow meters employing embodiments of the invention. A top electrical connection wire 24 is attached to the top of each of the elements 12 with a conductive epoxy 28 which is thinly spread over their entire top surfaces. Then those elements with electrical connections as sub-assemblies, are mounted in modified dovetail slots 34 milled into the wall of the metallic flow tube 16. The elements 12 are electrically connected and mechanically bonded to the bottom of the slots with an agent such as an electrically conductive epoxy or low temperature solder 26. A lead out wire 32 may be attached then or after encapsulation 30 as desired. The top electrical connection wires could originally be longer and even enter a supporting electronics assembly mounted on top of the flow tube, to avoid the additional step of attaching the lead out wire.

A preferred embodiment employs a dovetail groove 34 to provide a flow wall cavity elongated along a direction perpendicular to the flow axis 18 and spaced apart therefrom by a distance selected so that no part of the cavity penetrates an interior surface 31 of the wall 33. This cavity has a flat interior surface portion 29 proximate to the interior surface 31 of the wall 33 of the flow tube. The flat interior surface portion 29 is preferably matched in size to whatever transducer element is to be used. The cavity generally has a second interior surface portion 35 spaced apart from the flat interior surface portion 29. In the case of the preferred dovetail groove 34, the second portion 35 is a generally frusto-conical surface having a central slot 37. As noted, many other fabrication methods and cavity geometries may be employed. For example, one could consider using electric-discharge machining to cut a cavity having a semicircular cross sectional shape and not providing a slot through the external wall of the flow tube.

Moreover, a wide variety of flow tube shapes and sizes are compatible with the invention. Most commonly, the flow tube may be round, as depicted in FIG. 4B or may be rectangular, as depicted in FIG. 4A.

For small meters, a dovetail slot width of about ¼ inch wide has been found to be satisfactory for mounting elements with a mounting dimension just under that size. Such an element, having 0.020" thickness, corresponds to a four MHz thickness mode resonant frequency for a typical piezoelectric material. The thin element allows the least amount of flow tube material to be removed. There is just enough height clearance in the slot to assure that the tops of the elements do not contact the second portion 35 of the cavity's internal surface and cause a short circuit. A window 20 thickness of 0.010" has been used with such elements which have provided good acoustic and mechanical results.

An electrically conductive epoxy No. 3022, from VonRoll Isola, having a high temperature rating of 150 degrees C., has been found to work well for the top electrical connections on the elements. A low temperature solder, No. 290, from the Indium Corporation, having a melting point of 143 degrees C., has been found to work well for attaching the elements to the flow tube. This solder has a 3% silver content which makes it highly compatible with the typical silvered surfaces on the elements to promote good long term reliability of their bonding. Various encapsulants, typically epoxies with fillers, can be used. The fillers can be selected to provide acoustic damping for the elements.

Figure 5:
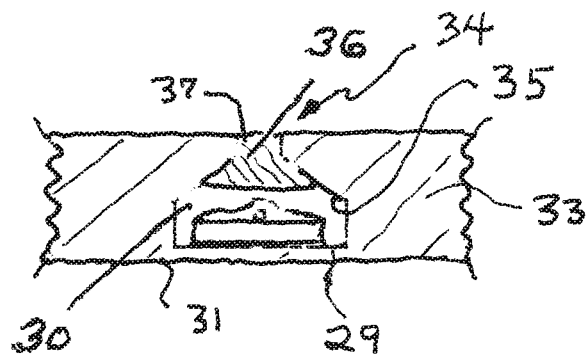
FIG. 5 is similar to FIG. 4A, but adds an insert to increase the pressure rating.

The flow tube wall thickness corresponding to the window 20 between the element and flow passage can be made very thin since the encapsulation can be selected to have a high compressive strength needed to withstand the normal expansion pressures exerted on the pipe. However, should a high pressure event fracture an element, the wide area of electrical connection on both surfaces of the element should enable the individual pieces to continue to operate so that the meter remains functional. Higher pressures can be also be accommodated with the addition of a small insert 36 to close up the central portion of the access slot as shown in FIG. 5.

The material used for the flow tube could be other than a metal, for example an electrically conductive plastic. It could even be an electrically insulating plastic if the elements are made with wraparound electrodes as used by the elements in FIGS. 1 and 2, so that the electrical terminations are conveniently made from the top. However, the relatively large difference in the coefficient of thermal expansion between the element and flow tube materials, and the increased risk of catastrophic failure due to element fracture, could seriously affect the reliability of the meter.

Figure 6:
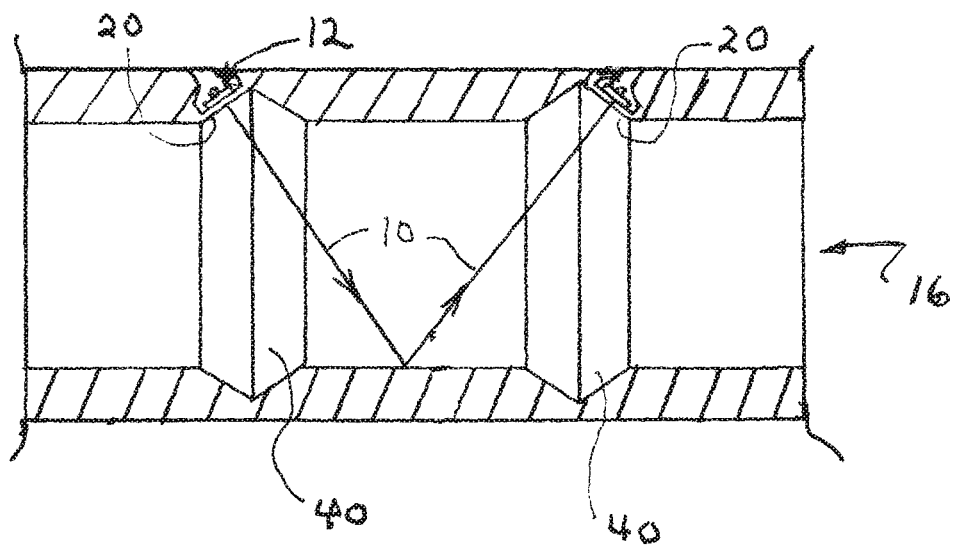
FIG. 6 is a schematic longitudinal cross section of a flow tube having V grooves cut into an interior surface to provide thin windows for an acoustic beam defined by a pair of angled transducers.

The transducer mounting slots or cavities discussed above have been shown oriented orthogonally to the flow passage. In that orientation, the transducers may be mounted in a flow tube with a relatively thin wall. However, when the wall thickness is increased, the slots may be angled to the flow passage as shown in the cross sectional view of FIG. 6. In this embodiment a large V-shaped groove 40 is cut into the interior of the flow tube at each transducer location so that both the internal and external surfaces of the acoustic windows 20 are parallel to the faces of the flat wafer transducer elements, as in FIGS. 3, 4A, and 5. This minimizes the acoustic diffraction that would otherwise occur. Although a V-shaped groove is convenient, the angles for each side of the groove need not be the same.

The increased amount of material required for the flow tube and greater care required for its fabrication to produce the acoustic windows, is offset by the elimination of reflectors. The attenuation of the acoustic signal between the transducers is also advantageously reduced. Therefore, in applications where the flow tube wall may be made thick, the configuration depicted in FIG. 6 may be preferred.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. An ultrasonic flow meter comprising a flow tube having a flow axis along which fluid flows when the meter is operating, the flow tube having a wall comprising an interior surface proximal the flow axis and an exterior surface distal therefrom, the flow meter further comprising:
   a cavity disposed in the wall, the cavity not penetrating the interior surface thereof, the cavity elongated along a direction perpendicular to the flow axis and spaced apart therefrom, the cavity having a flat interior surface portion proximal the interior surface of the flow tube and a second interior surface portion distal therefrom;
   a piezoelectric transducer wafer having a first of two flat surfaces bonded rigidly to the flat interior surface portion of the cavity; and an encapsulant bonding the second flat surface of the transducer wafer to the second interior surface portion of the cavity.

2. The flow meter of claim 1 wherein the cavity comprises a dovetail groove comprising a slot in the exterior surface of the wall of the flow tube.

3. The flow meter of claim 1 wherein the interior surface of the wall of the flow tube comprises a groove defining a facet skewed with respect to the flow axis and wherein the flat interior surface portion of the cavity is parallel to the facet.

4. The flow meter of claim 1 wherein the interior surface of the flow tube wall comprises a circular cylinder.

5. The flow meter of claim 1 wherein the interior surface of the flow tube wall is rectangular when viewed along the flow axis and wherein an acoustic window between the interior surface of the flow tube wall and the flat surface portion of the cavity has a constant thickness.

6. The flow meter of claim 1 further comprising a strengthening insert disposed between the second surface of the transducer wafer and the second interior surface portion of the cavity.

7. The flow meter of claim 1 wherein the first of two flat surfaces of the piezoelectric transducer wafer is bonded rigidly to the flat interior surface portion of the cavity by a solder.

8. An ultrasonic flow meter comprising a flow tube having a flow axis along which fluid flows when the meter is operating, the flow tube having a flow tube wall comprising an interior surface proximal the flow axis and an exterior surface distal therefrom, the flow meter further comprising:
   a dovetail groove cut into the flow tube wall along a line perpendicular to the flow axis and spaced apart therefrom, the dovetail groove not penetrating the interior surface of the wall, the groove comprising: a flat surface portion proximal the interior surface of the flow tube wall; a second, slanted surface portion that narrows with distance from the flow tube axis; and a slit extending through the exterior surface of the flow tube wall;
   a piezoelectric transducer wafer having a first of two flat surfaces bonded rigidly to the flat interior surface portion of the dovetail groove; and
   an encapsulant bonding the second flat surface of the transducer wafer to the second surface portion of the dovetail groove.

9. The flow meter of claim 8 wherein the interior wall of the flow tube comprises a groove defining a facet skewed with respect to the flow axis and wherein the flat interior surface portion of the dovetail groove is parallel to the facet.

10. The flow meter of claim 8 wherein the interior surface of the flow tube wall comprises a circular cylinder.

11. The flow meter of claim 8 wherein the interior surface of the flow tube wall is rectangular when viewed along the flow axis and wherein an acoustic window between the interior surface of the flow tube wall and the flat surface portion of the dovetail groove has a constant thickness.

12. The flow meter of claim 8 further comprising a strengthening insert disposed between the second surface of the transducer wafer and the second interior surface portion of the dovetail groove.

13. The flow meter of claim 8 wherein the first of two flat surfaces of the piezoelectric transducer wafer is bonded rigidly to the flat interior surface portion of the dovetail groove by a solder.

\* \* \* \* \*